US011607807B2

(12) United States Patent
Khansari Zadeh et al.

(10) Patent No.: US 11,607,807 B2
(45) Date of Patent: *Mar. 21, 2023

(54) MACHINE LEARNING METHODS AND APPARATUS FOR AUTOMATED ROBOTIC PLACEMENT OF SECURED OBJECT IN APPROPRIATE LOCATION

(71) Applicant: X Development LLC, Mountain View, CA (US)

(72) Inventors: Seyed Mohammad Khansari Zadeh, San Carlos, CA (US); Mrinal Kalakrishnan, Mountain View, CA (US); Paul Wohlhart, Sunnyvale, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/230,628

(22) Filed: Apr. 14, 2021

(65) Prior Publication Data

US 2021/0229276 A1 Jul. 29, 2021

Related U.S. Application Data

(63) Continuation of application No. 16/167,596, filed on Oct. 23, 2018, now Pat. No. 11,007,642.

(51) Int. Cl.
*B25J 9/16* (2006.01)
*G06N 5/04* (2006.01)
(Continued)

(52) U.S. Cl.
CPC ............ *B25J 9/163* (2013.01); *B25J 9/1664* (2013.01); *B25J 9/1697* (2013.01); *G06N 5/046* (2013.01); *G06N 20/00* (2019.01)

(58) Field of Classification Search
CPC ........ B25J 9/163; B25J 9/1664; B25J 9/1697; G06N 20/00; G06N 5/046
See application file for complete search history.

(56) References Cited

U.S. PATENT DOCUMENTS 9,914,213 B2 3/2018 Vijayanarasimhan et al.
10,058,995 B1 * 8/2018 Sampedro ................ B25J 9/163
(Continued)

OTHER PUBLICATIONS

Rahmatizadeh, Rouhollah et al.; Vision-Based Multi-Task Manipulation for Inexpensive Robots Using End-to-End Learning from Demonstration; IEEE International Conference on Robotics and Automation; 8 pages; dated Apr. 2018.
(Continued)

*Primary Examiner* — Nicholas Kiswanto
*Assistant Examiner* — Jamal A Shah
(74) *Attorney, Agent, or Firm* — Gray Ice Higdon

(57) ABSTRACT

Training and/or use of a machine learning model for placement of an object secured by an end effector of a robot. A trained machine learning model can be used to process: (1) a current image, captured by a vision component of a robot, that captures an end effector securing an object; (2) a candidate end effector action that defines a candidate motion of the end effector; and (3) a target placement input that indicates a target placement location for the object. Based on the processing, a prediction can be generated that indicates likelihood of successful placement of the object in the target placement location with application of the motion defined by the candidate end effector action. At many iterations, the candidate end effector action with the highest probability is selected and control commands provided to cause the end effector to move in conformance with the corresponding end effector action. When at least one release criteria is satisfied, control commands can be provided to cause the end effector to release the object, thereby leading to the object being placed in the target placement location.

16 Claims, 9 Drawing Sheets

(51) Int. Cl.
*G06N 20/00* (2019.01)
*G06N 5/046* (2023.01)

(56) References Cited

U.S. PATENT DOCUMENTS

| | | | |
|---|---|---|---|
| 11,007,642 B2 | 5/2021 | Khansari Zadeh | |
| 2013/0266205 A1* | 10/2013 | Valpola | B25J 9/1697 |
| | | | 382/153 |
| 2017/0252922 A1* | 9/2017 | Levine | B25J 9/1664 |
| 2017/0252924 A1* | 9/2017 | Vijayanarasimhan | |
| | | | G05B 19/18 |
| 2017/0300493 A1* | 10/2017 | Ripley | B07C 5/342 |

OTHER PUBLICATIONS

Levine, Sergey et al.; Learning Hand-Eye Coordination for Robotic Grasping with Deep Learning and Large-Scale Data Collection; 12 pages; 2016.

European Patent Office; International Search Report and Written Opinion of Ser. No. PCT/US2019/057489; 16 pages; dated Jan. 31, 2020.

Jang, Eric et al.; End-to-End Learning of Semantic Grasping; 14 pages; dated Nov. 9, 2017.

Koo, Seongyong et al.; Robolink Feeder: Reconfigurable Bin-Picking and Feeding with a Lightweight Cable-Driven Manipulator; IEEE International Conference on Automation Science and Engineering; 8 pages; China; dated Aug. 2017.

Finn, Chelsea et al.; Unsupervised Learning for Physical Interaction through Video Prediction; 9 pages; 2016.

Bousmalis, Konstantinos et al.; Using Simulation and Domain Adaptation to Improve Efficiency of Deep Robotic Grasping; 9 pages; 2017.

Rahmatizadeh, R. et al.; "Vision-Based Multi-Task Manipulation for Inexpensive Robots Using End-to-End Learning from Demonstration;" Version 1; retrieved from internet: https://arXiv.org/pdf/1707.02920v1.pdf; 11 pages; dated Jul. 10, 2017.

Levine, S. et al.; "Learning Hand-Eye Coordination for Robotic Grasping with Deep Learning and Large-Scale Data Collection;" International Journal of Robotics Research, vol. 37, No. 4-5, pp. 421-436, Jun. 12, 2017.

* cited by examiner

MACHINE LEARNING METHODS AND APPARATUS FOR AUTOMATED ROBOTIC PLACEMENT OF SECURED OBJECT IN APPROPRIATE LOCATION

BACKGROUND

Many robots are programmed to utilize one or more end effectors to secure (e.g., grasp) one or more objects. For example, a robot may utilize a grasping end effector such as an "impactive" gripper or "ingressive" gripper (e.g., physically penetrating an object using pins, needles, etc.) to pick up an object. Some additional examples of robot end effectors that may secure objects include "astrictive" end effectors (e.g., using suction or vacuum to pick up an object) and one or more "contigutive" end effectors (e.g., using surface tension, freezing or adhesive to pick up an object), to name just a few.

Many robots are also programmed to utilize the one or more end effectors to place a secured object in a preprogrammed and fixed location. For example, a robot may be programmed to grasp objects from a first location on a conveyor belt and place the grasped object in a bin based on the bin being in a preprogrammed fixed location.

However, these and/or other approaches can have one or more drawbacks. For example, many programmed robots may fail in dynamic environments and/or may fail in varying environments. For instance, in the preceding example where the robot is programmed to place the grasped object in the bin based on the bin being in the preprogrammed fixed location, the robot will fail to place the grasped object in the bin if the bin has been moved to a different location that is not the preprogrammed fixed location. Also, for instance, if the robot is placed in a new environment where the bin is in a different location, the robot will not adapt to the new environment without explicit user programming.

SUMMARY

This specification is directed generally to machine learning methods and apparatus related to placement of an object, that is secured (e.g., grasped) by a robot end effector, in an appropriate location. More particularly, implementations are directed to training and/or use of a machine learning model (e.g., a deep neural network model) for placement of a secured object.

In various implementations, a machine learning model trained according to implementations disclosed herein can be used to process at least: (1) a current image that is captured by a vision component (e.g., a camera) of a robot and that captures an end effector that is securing an object; (2) a candidate end effector action that defines a candidate motion (e.g., translational and/or rotational), if any, of the end effector; and (3) a target placement input that indicates a target placement location for the object.

Based on the processing, a prediction (e.g., a probability) can be generated that indicates a likelihood of successful placement of the object in the target placement location with application of the motion defined by the candidate end effector action. At each iteration, the machine learning model can be utilized to consider one or more candidate end effector actions. At many iterations, the candidate end effector action with the highest probability is selected and a corresponding end effector motion command is provided to actuators of the robot to cause the end effector to move in conformance with the corresponding end effector action. This can be performed at a relatively high frequency thereby enabling continual adjustment of the end effector motion to cause the end effector to traverse to a location that is likely to lead to a successful placement of the object (i.e., a placement of the object in the target placement location).

When at least one release criteria is satisfied, a release command can be provided to cause the end effector to release the object, thereby leading to the object being placed in the target placement location. The at least one release criteria can include, for example, determining in an iteration that a predication generated based on processing a "null" candidate end effector action (e.g., that results in no further movement) satisfies one or more thresholds, such as an absolute threshold and/or one or more thresholds that are based on predictions(s) generated in the iteration based on other candidate end effector action(s). The at least one release criteria can additionally or alternatively include, for example, determining that the prediction for a most recently implemented candidate end effector action satisfied one or more thresholds. In these and other manners, the trained machine learning model can be utilized to servo an end effector that is securing an object to cause the end effector to traverse to a pose that is likely to result in the object being placed in a target location, and to cause the end effector to release the object at the pose.

The target placement input applied to the trained machine learning model can be based on one or more classification(s) of the object being secured, a robotic task being performed, and/or one or more other criteria. For example, the target placement input can be a semantic indication of a placement location that is mapped to classification(s) of the object. For instance, the target placement input of "compost bin" (or "0", "AZ84" or other identifier of a compost bin) can be mapped to various classifications such as "food", "banana", "apple", "egg shells", etc. Also, for instance, the target placement input of "recycle bin" (or "1", "QX23" or other identifier of a recycle bin) can be mapped to various classifications such as "plastic bottle", "soda can", "paper", etc. As yet another instance, the target placement input of "to the right of the plate" (or other identifier) can be mapped to various classifications such as "napkin", "fork", etc.—and optionally to a robotic task of "setting the table". In various implementations, the classification(s) can be determined based on processing image(s) of an object using one or more classification model(s). For example, after the object is grasped by an end effector, the end effector can be moved to present the object to the vision component of the robot, image(s) captured, and those image(s) used to determine the classification(s). For instance, 10 images of an object can be captured, and if 8 indicate a classification of banana and 2 indicate a classification of bottle, the banana classification can be selected. Also, for example, before or during securing of the object, image(s) can be captured, and those image(s) used to determine the classification(s). In various other implementations, the classification(s) can be determined based on additional and/or alternative signal(s). For example, a user may provide spoken or other input that indicates the classification (e.g., "robot, you're holding a banana"), the object can be selected from a location where classification(s) of the object are known, the object can be assumed to be of a certain classification based on a performed grasp targeting an object of the certain classification, etc.

As mentioned above, the target placement input can include a semantic indication in various implementations. In additional or alternative implementations, the target placement input can additionally or alternatively include: an image that is similar to the placement location (e.g., an image of a recycle bin); a segmentation mask, bounding box, or other spatial identifier of a location of the target location in an image of the robot's environment (e.g., determined based on processing the image of the environment to detect the target location).

Various implementations can train the machine learning model based on data from real and/or simulated placement attempts where corresponding real or simulated robots move a secured object (e.g., randomly for a fixed time period), then release the object. Those placement attempts that lead to the object being placed in a target location can be used to generate positive training example labels for corresponding training examples having training example input with a target placement input that corresponds to the target location (and can also optionally be used to generate negative training example labels for corresponding training examples having training example input with a different target placement input that does not correspond to the target location). Those placement attempts that lead to the object not being placed in any target location can be used to generate negative training example labels for all corresponding training examples. Each training example can include training example input with: a "current image" from a corresponding instance of time of the training example; a candidate end effector action that defines movement from a "current pose" at the corresponding instance of time to a "final pose" at a final instance of time of the placement attempt; and a corresponding target placement input. Each training example can include a labeled training example output that indicates whether the placement of the object was in the target location indicated by the target placement input of the training example input. Human labeling and/or automated labeling (e.g., for simulated training examples) can be utilized.

It is noted that the placement attempts can be performed utilizing various target locations, various poses for the target locations, various environments, and various secured objects. For example, a trash bin can be in a first pose in some placement attempts, in a second pose in other placement attempts, in a third pose in others, etc. In these and other manners, the machine learning model can be trained to be robust and enable placement in a target location in a variety of environments. Moreover, the machine learning model can be trained to enable placement in any of a variety of target locations (e.g., trash bins, recycle bins, compost bins, on a shelf, beside a plate, on the floor).

Some implementations train the machine learning model using simulated training examples and/or real training examples. Simulated training examples are those that are based on simulated data, where the simulated data is generated based on simulated robot(s) attempting simulated placements of various simulated objects, in simulated environments and with simulated placement locations. The simulated placements can be performed using one or more simulators each executing on one or more computing devices, and the simulated training examples generated based on generated output from the simulators in performance of the simulated placements. Real training examples are based on data from real-world physical robots attempting placements of various objects. In some implementations, the machine learning model is initially trained using simulated training examples, then adapted through further training that is based on real training examples.

The above description is provided as an overview of some implementations of the present disclosure. Further description of those implementations, and other implementations, are described in more detail below.

In some implementations, a method implemented by one or more processors of a robot is provided, and includes identifying one or more object images. The one or more object images are each captured by a vision component associated with the robot, and the one or more object images each capture an object in an environment of the robot. The method further includes generating a target placement input that indicates at least one characteristic of a placement location for the object. Generating the target placement input can be based on classification output generated by processing the one or more object images using a trained classification model. The method further includes, while the end effector of the robot is securing the object: identifying a current image captured by the vision component, where the current image captures the end effector and at least part of the environment; generating one or more candidate end effector actions each defining corresponding motion to move the end effector; and for each candidate end effector action of the one or more candidate end effector actions: processing, using a trained placement model, the target placement input, the current image, and the candidate end effector action, and generating, based on the processing, a prediction of successful placement of the object with application of the motion defined by the corresponding candidate end effector action. The method further includes generating control commands that conform to the candidate end effector action that, when processed using the trained placement model, resulted in the prediction that is most indicative of successful placement of the object. The method further includes providing the control commands to one or more actuators of the robot to cause the end effector to move while continuing to secure the object. The method further includes determining to cause the end effector to release the object after providing the control commands and, in response to determining to cause the end effector to release the object, providing one or more additional control commands to cause the end effector to release the object.

These and other implementations of the technology can include one or more of the following features.

In some implementations, determining to cause the end effector to release the object is based on determining that the prediction, that is most indicative of successful placement of the object, satisfies one or more criteria.

In some implementations, determining to cause the end effector to release the object includes: generating an additional prediction based on processing, using the trained placement model: the target placement input, an additional current image, and a null end effector action, where the additional current image is captured after providing the end effector motion command; and determining to cause the end effector to release the object based on the additional prediction satisfying one or more criteria.

In some implementations, the one or more object images are captured while the object is secured by the end effector of the robot.

In some implementations, the method further includes causing, after the end effector has secured the object, the end effector of the robot to move to one or more predetermined poses relative to the vision component; and causing the one or more object images to be captured while the end effector is in the one or more predetermined poses. In some of those implementations, identifying the one or more object images is based on the one or more object images being captured while the end effector is in the one or more predetermined poses.

In some implementations, the classification output indicates at least one semantic classification of the object, and generating the target placement input is based on the semantic classification being mapped to the target placement input. In some versions of those implementations, the target placement input includes a semantic identifier that identifies one of a plurality of candidate placement locations, such as two or more of a trash bin, a recycle bin, and a compost bin. In some additional or alternative versions of those implementations, the semantic classification of the object indicates a class of the object, a weight of the object, a size of the object, and/or a material of the object.

In some implementations, the target placement input includes an image that is similar to the placement location.

In some implementations, the target placement input includes an image-based spatial identifier of the target placement location. In some of those implementations, generating the target placement input includes: processing an additional image that is of the environment and that is captured by the vision component; determining, based on the classification output, a portion of the additional image that conforms to the target placement location; and generating the image-based spatial identifier based on the portion of the additional image that conforms to the target placement location.

In some implementations, the method further includes identifying a task being performed by the robot. In some of those implementations, generating the target placement input is further based on the task that is being performed by the robot.

In some implementations, a method implemented by one or more processors of a robot is provided and includes generating a target placement input that indicates at least one characteristic of a placement location for an object secured by an end effector of a robot. The method further includes, at each of a plurality of iterations while the end effector of the robot is securing the object, and until determining that at least one release criteria is satisfied: moving the end effector of the robot while the end effector of the robot is securing the object. Moving the end effector of the robot is based on predictions of successful placement that are each generated based on processing, using a trained placement model, of: the target placement input, a corresponding current image that is captured by a vision component of the robot and that captures the end effector, and a corresponding candidate end effector action that defines corresponding motion to move the end effector. The method further includes, in response to determining that the at least one release criteria is satisfied: causing the end effector to release the secured object.

These and other implementations of the technology can include one or more of the following features.

In some implementations, determining that the at least one criteria is satisfied is based on one of the generated predictions and/or an additional prediction generated based on processing, using the trained placement model, of: the target placement input, an additional current image, and a null end effector action.

In some implementations, generating the target placement input is based on a task that is being performed by the robot.

In some implementations, the method further includes classifying the object based on one or more images of the object that are captured by the vision component of the robot. In some of those implementations, generating the target placement input is based on the classifying.

In some implementations, a method of training a placement machine learning model is provided and includes identifying, by one or more processors, a plurality of training examples generated based on sensor output from one or more robots during a plurality of placement attempts by the robots, where each of the placement attempts is performed over a plurality of instances of time. Each of the training examples include training example input including: a corresponding image for a corresponding instance of time of a corresponding placement attempt of the placement attempts the corresponding image capturing a robotic end effector at the corresponding instance of time while the corresponding end effector is securing a corresponding object; a corresponding end effector action defining motion of the end effector to move from a corresponding instance of time pose of the end effector at the corresponding instance of time to a corresponding final pose of the end effector for the corresponding placement attempt; and a corresponding target placement input that indicates at least one characteristic of a corresponding target placement location for the object. Each of the training examples further includes training example output including: a corresponding placement success label that indicates whether the corresponding object was placed in the target placement location as a result of the corresponding placement attempt. The method further includes training, by one or more of the processors, the placement machine learning based on applying the training example input of the training examples to the placement machine learning model and updating parameters of the placement machine learning based on the training example output of the training examples.

In some implementations, the robots include simulated robots simulated by one or more robot simulators, and the placement attempts include simulated placement attempts performed using the one or more robot simulators.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
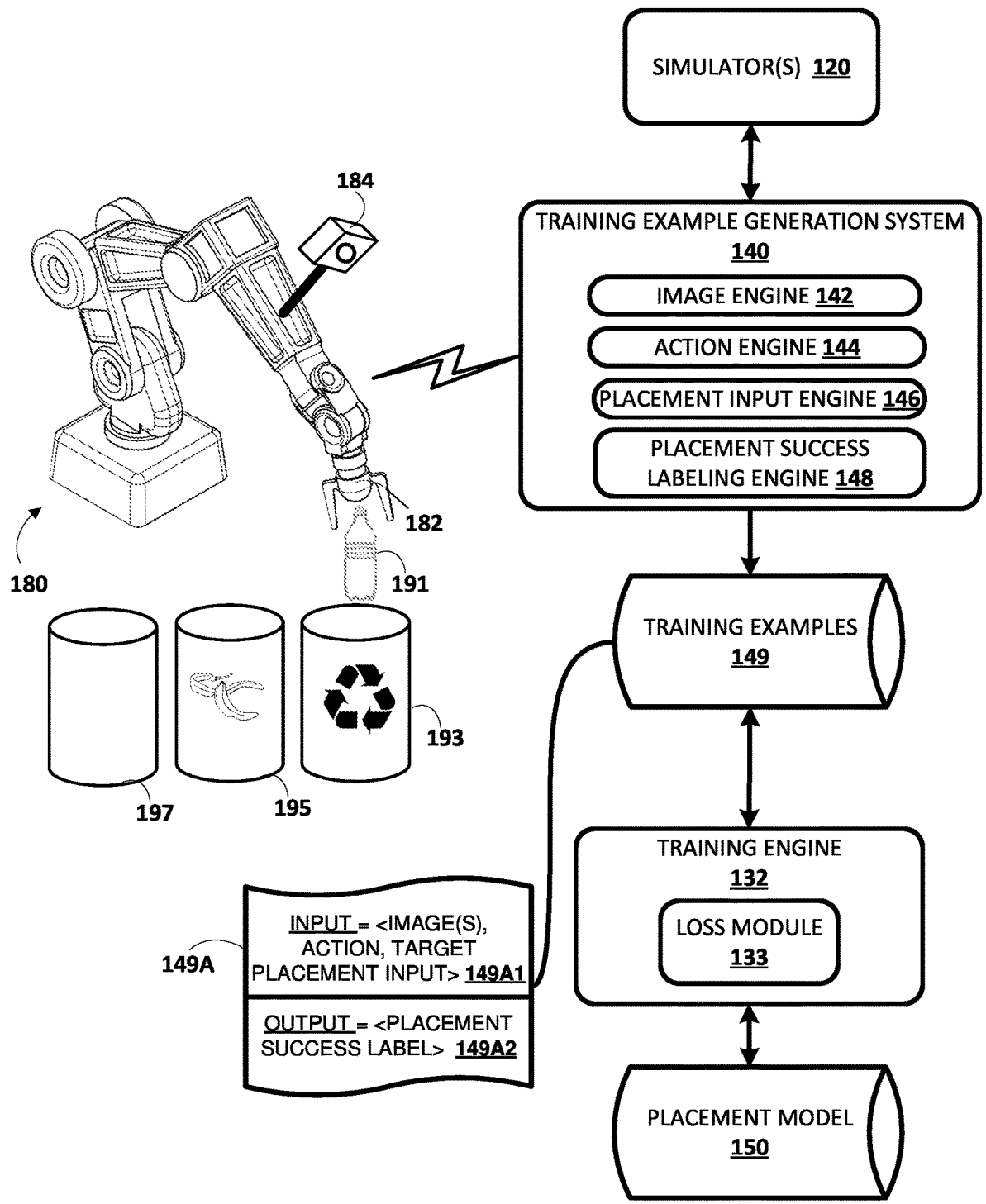
FIG. 1 illustrates an example environment in which placement attempts can be performed and placement training examples can be generated based on the placement attempts.

FIG. 1 illustrates an example environment in which placement attempts can be performed and placement training examples can be generated based on the placement attempts. FIG. 1 includes a training example generation system 140, which is implemented by one or more computer systems. The simulated training example generation system 140 interfaces with one or more simulators 120 and/or one or more robots (e.g., robot 180) in generating training examples 149 that are utilized by training engine 132 in training placement model 150.

Example robot 180 is illustrated in FIG. 1 as one example of a robot that can be utilized in performing placement attempts that can be utilized in generating training examples 149. Robot 180 is also one example of a robot that can utilize placement model 150, when trained, in automated placement of an object, secured (e.g., grasped or otherwise secured) by the robot, in an appropriate location. The same and/or similar robot can be simulated by the simulator(s) 120 in performing simulated placement attempts that can be utilized in generating training examples 149. Robot 180 is a "robot arm" having multiple degrees of freedom to enable traversal of end effector 182 along any of a plurality of potential paths to position the end effector 182 in desired locations. Robot 180 further controls two opposed "claws" of end effector 182 to actuate the claws between at least an open position and a closed position (and/or optionally a plurality of "partially closed" positions).

Example vision component 184 is also illustrated and, in FIG. 1, is mounted on a link of the robot 180. The pose of the vision component 184 therefore changes as the pose of that link moves. Further, the vision component 184 can also optionally independently adjust its pose relative to that link (e.g., pan and/or tilt). In other implementations, the vision component 184 may be coupled to another link of the robot and/or provided near the robot (but not coupled to the robot) and/or at a fixed pose relative to the base or other stationary reference point of robot 180. Vision component 184 generates images related to shape, color, depth, and/or other features of object(s) that are in the line of sight of the sensors. The vision component 184 can be, for example, a monographic camera (e.g., generating 2D RGB images), a stereographic camera (e.g., generating 2.5D RGB images), and/or a laser scanner (e.g., generating a 2.5D "point cloud"). It is understood that in many implementations, when simulator(s) 120 are additionally or alternatively utilized in performing placement attempts, the rendered images of the simulated data will be rendered to be of the same type as the images generated by the vision component 184. For example, both may be 2.5D RGBD images.

The vision component 184 has a field of view of at least a portion of the environment of the robot 180, such as the portion of the environment that includes example object 191 (a plastic bottle) and that includes recycle bin 193, compost bin 195, and trash bin 197. In FIG. 1, recycle bin 193, compost bin 195, and trash bin 197 each represent a respective placement location, and the object 191 is illustrated as being released from the end effector 182 of the robot, into the recycle bin 193.

Although a particular object 191 is illustrated in FIG. 1, as described herein various disparate types of objects can be utilized in real and/or simulated episodes, and placement model 150, when trained, can be utilized to automatically appropriately place various disparate types of objects. Moreover, although particular placement locations are illustrated in FIG. 1, and are illustrated at particular poses in the environment, as described herein various disparate types of placement locations and/or poses for the placement locations can be utilized in real and/or simulated episodes, and placement model 150, when trained, can be utilized to automatically appropriately place an object in any of a variety of placement locations that are in any of a variety of poses. Yet further, although a particular robot 180 is illustrated in FIG. 1, additional and/or alternative robots may be utilized, including additional robot arms that are similar to robot 180, robots having other robot arm forms, robots having a humanoid form, robots having an animal form, robots that move via one or more wheels, an unmanned aerial vehicle ("UAV"), and so forth. Also, although a particular end effector 182 is illustrated in FIG. 1, additional and/or alternative end effectors may be utilized to secure and release an object, such as alternative impactive grasping end effectors (e.g., those with grasping "plates", those with more or fewer "digits"/"claws"), "ingressive" end effectors, "astrictive" end effectors, "contigutive" end effectors, etc.

The simulator(s) 120 are implemented by one or more computer systems, and can be used to simulate various environments that include corresponding environmental objects and corresponding placement location(s), to simulate a robot operating in the environment, to simulate responses of the robot in response to virtual implementation of various simulated robotic actions, and to simulate interactions between the robot, the environmental objects, and the placement locations, in response to the simulated robotic actions. Various simulators can be utilized, such as physics engines that simulate collision detection, soft and rigid body dynamics, etc. One non-limiting example of such a simulator is the BULLET physics engine.

Robot 180, other physical robot(s), and/or simulator(s) 120 can be utilized to perform placement attempts, and data associated with the placement attempts utilized by the training example generation system 140 to generate training examples 149, and store them in one or more databases. In some implementations, all or aspects of system 140 may be implemented on one or more computing devices that are in network communication with robot 180, other robot(s), and/or simulator(s) 120.

Each placement attempt by robot 180, other robot, and/or simulator(s) 120 consists of T separate time steps or instances. At the start of each placement attempt, the end effector of a corresponding robot is in a corresponding starting pose and is securing a corresponding object. The starting poses can differ among various placement attempts. For example, the starting pose of each placement attempt can be randomly or pseudo-randomly selected for each placement attempt. In simulated placement attempts, the end effector can be caused to secure the corresponding object through placement of the corresponding object and/or manipulation of the end effector in simulation. In real-world placement attempts (i.e., those performed by a real physical robot, such as robot 180), the corresponding object can be previously secured by the end effector by a human manually placing the object, or through the robot automatically grasping the object using one or more grasping techniques.

At each time step of the placement attempt, until a final time step: the end effector continues to secure the object (e.g., grasping "claws" are maintained in position, suction/vacuum is maintained, etc.); a current image is stored; a current pose of the end effector is also stored; and a robot action is determined and implemented. The robot action causes the end effector of the robot to move. For example, the robot action can cause the end effector to move translationally and/or rotationally. Each of the robot actions can optionally be randomly or pseudo-randomly determined. At a final time step T, the robot releases the object (e.g., opens grasping "claws", removes suction/vacuum). For example, for a gripper end effector having two opposed "grasping members", the grasping members can be actuated to cause them to "open" (e.g., move farther apart). After the final time step in real-world placement attempts, the robot optionally performs one or more additional actions to enable determination of a placement location where the object was placed when released.

When a real robot (e.g., robot 180) is performing the placement attempt, each current image can be captured by the vision component of the robot, each current pose can be based on sensor data from the robot, and the robot can optionally capture one or more images of the secured object before the placement attempt and/or one or more images of the environment after the release of the object. As described herein, the image(s) of the secured object before the placement attempt, and/or the image(s) of the environment can be utilized in generating target placement inputs for training examples that are based on the placement attempt, and placement success labels for such training examples.

When a simulator 120 is performing the placement attempt, each current image can be a rendered image that is rendered from the perspective of a virtual vision component of the robot, each current pose can be based on simulated robot data from the simulator, and data from the simulator can be utilized to determine the secured object that was placed during the episode, and a placement location for the object after release. As described herein, the secured object and the placement location after its release, can be utilized in generating target placement inputs for training examples that are based on the placement attempt, and placement success labels for such training examples.

A large number (e.g., thousands, hundreds of thousands, millions) of placement attempts are performed utilizing the simulator(s) 120 and/or real robots, such as robot 180. Each placement attempt can be performed in a corresponding environment with corresponding environmental objects, a corresponding object that is secured and to be placed, and corresponding placement locations. As described herein, the environmental objects, object that is secured and to be placed, and/or placement locations can be varied among the placement attempts. For example, a first real-world placement attempt can occur with the bottle 191 of FIG. 1, and the bins 193, 195, and 197 in the poses illustrated in FIG. 1. A second real-world placement attempt can occur with a banana peel as the secured object to be placed, and with the bins 193, 195, and 197 in different poses (e.g., bin 193 can be in the middle, instead of bin 195). A third real-world placement attempt can occur with an aluminum can as the secured object to be placed, and with a compost, recycling, and trash bin that vary (e.g., different colors, shapes, and/or sizes) from those illustrated in FIG. 1. A fourth real-world placement attempt can occur with a dinner plate as the secured object to be placed and with placement locations of a utensil basket of a dishwasher, an upper rack area of the dishwasher, and a non-utensil basket lower rack area of the dishwasher. A fourth real-world placement attempt can occur with a white shirt as the secured object to be placed and with placement locations of a whites laundry bin and a darks laundry bin. Through varying of placement locations and/or environmental objects, diverse training examples can be generated that enable training of a placement model 150 that can be utilized in any of a variety of environments for successful placing of an object and/or the can be utilized to place an object in any of a variety of placement locations.

The training example generation system 140 includes an image engine 142, an action engine 144, a target placement input engine 146, and a placement success labeling engine 148. In generating a training example, the training example generation system 140 selects an instance of a placement attempt. The image engine 142 includes the current image for the instance in training example input of the training example, and optionally includes an environment image in the training example input. The environment image can be, for example, an image of the environment before the start of the placement attempt and that optionally omits the end effector and the secured object. For example, immediately before the start of the placement attempt the end effector can be moved out of the field of view of the camera when the environmental image is captured.

The action engine 144 determines an end effector action for the training example, and includes the end effector action in training example input of the training example. The action engine 144 determines the end effector action based on the current pose for the instance and a final pose of the placement attempt (e.g., the final pose when the object is released). For example, the action engine 144 can determine a transformation between a current pose for the instance and the final pose of the placement attempt, and use the transformation as the end effector action. The end effector action can be, for example, a vector of values that encodes a direction of translational movement (e.g., in Cartesian space) for the end effector and, optionally, rotational movement (if any) for the end effector.

The target placement input engine 146 generates a target placement input to include in training example input of the training example. The target placement input engine 146 can work in concert with the placement success labeling engine 148. The target placement input engine 146 generates, for inclusion in training example input of the training example, target placement input that corresponds to a placement location. The target placement input can include a semantic indication in various implementations. In additional or alternative implementations, the target placement input can additionally or alternatively include: an image that is similar to the placement location (e.g., an image of a recycle bin); a segmentation mask, bounding box, or other spatial identifier of a location of the target location in an image of the robot's environment (e.g., determined based on processing the image of the environment to detect the target location). The placement success labeling engine 148 generates either a positive label (e.g., "1") or a negative label (e.g., "0") for the training example. The placement success labeling engine 148 generates a positive label when the placement attempt places the object in the placement location corresponding to the target placement input, and generates a negative label when the placement attempt does not place the object in the placement location corresponding to the target placement input.

For simulated placement attempts, the placement success labeling engine 148 can generate an appropriate label for a given placement attempt based on analysis of data from the simulated placement attempt. For instance, the placement success labeling engine 148, in generating a label for a training example based on the given placement attempt, can determine whether the placement attempt resulted in the object being placed at the location corresponding to the target placement input of the training example. If so, a positive label can be assigned to the training example and, if not, a negative label can be assigned. For real-world placement attempts, the placement success labeling engine 148 can optionally rely on feedback from human reviewers in generating appropriate labels. For example, image(s) captured after a given placement attempt can be sent to human reviewers, who can indicate a location where a secured object was placed. The placement success labeling engine 148 can, in generating a label for a training example based on the given placement attempt, can determine whether the human reviewer indicated location corresponds to the target placement input of the training example. If so, a positive label can be assigned to the training example and, if not, a negative label can be assigned. The placement success labeling engine 148 can utilize additional and/or alternative labeling techniques in other implementations.

Accordingly, the engines 142, 144, 146, and 148 can generate at least one training example based on each instance of a placement attempt. One such training example is illustrated in FIG. 1 as training example 149A. Training example 149A includes training example input 149A1 that includes: image(s) (e.g., a current image and optionally an environmental image); an end effector action; and a target placement input. Training example 149A further includes training example output 149A2 that is a placement success label (e.g., a "1" or a "0").

As one example, assume a placement attempt as illustrated in FIG. 1 where at a final time step the bottle 191 is released from the end effector 182 (as illustrated in FIG. 1), causing it to be placed in recycle bin 193. A training example can be based on an instance, during the placement attempt, that precedes the release of the bottle 191. The training example input can include a current image from that instance, an end effector action that is based on the end effector pose at that instance and the final end effector pose (i.e., the final pose illustrated in FIG. 1), and a target placement input. For a positive training example, the target placement input can indicate the recycle bin 193, and the training example output can be a "1" or other "positive" value. For a negative training example (if any is generated based on the placement attempt), the target placement input can indicate the compost bin 195 or the trash bin 197, and the training example output can be a "0" or other "negative" value.

As one particular example, for a positive training example the target placement input can be a semantic identifier of the recycle bin 193, such as "recycle bin" (or "1", "QX23" or other identifier of a recycle bin). As another particular example, the target placement input can be an image of the recycle bin 193 (or of a similar recycle bin). As yet another particular example, the target placement input can be a segmentation mask, bounding box, or other spatial identifier of a location of the target location in an image of the robot's environment (e.g., in an environmental image, as described above, that captures the robot's environment, including the recycle bin). For instance, the segmentation mask can have the same dimensions as the environmental image, but can include only a single channel with first values (e.g., "1s") where the recycle bin (or at least an opening of the recycle bin) is present in the rendered image, and second values (e.g., "0s") at all other locations. Alternative segmentation mask values/techniques can be utilized, such as techniques that have additional value(s) (e.g., value(s) between "0" and "1") near the edges of the recycle bin (or at least an opening of the recycle bin), or techniques that include a first value (e.g., "1") in only some locations where the recycle bin (or at least an opening of the recycle bin) is present in the environmental image (e.g., a "1" or other value in only a subset of (e.g., only one of) multiple pixels corresponding to the recycle bin in the rendered image). Also, for instance, a two-dimensional bounding box (or other shape) can be utilized that indicates the pixels that encompass all or portions of the recycle bin (or at least an opening of the recycle bin). The bounding box (or other shape) can be provided as an input that indicates the dimensions and position of the bounding box (or other shape) relative to the environmental image (e.g., an input that identifies a "center" pixel of the bounding box, and the size of the bounding box).

Accordingly, for a placement attempt where an object is placed in a placement location, T positive training examples can be generated, each represented by ($I_O$, $I_i$, $p_T$–$p_i$, $TPI_p$, $L_p$), where $I_O$ is the optional environmental image, $I_i$ is the image for a corresponding time step, $p_i$ is the pose of the end effector at the corresponding time step, $p_T$ is the pose of the end effector at the final time step (accordingly, $p_T$–$p_1$ represents an end effector action for the corresponding time step), $TPI_p$ is a target placement input that corresponds to the placement location, and $L_p$ is a positive placement success label.

Further, for a placement attempt where an object is placed in a target location, T negative training examples can optionally be generated, each represented by ($I_O$, $I_i$, $p_T$–$p_i$, $TPI_n$, $L_n$), where $I_O$ is the optional environmental image at the start of the episode, $I_i$ is the rendered image for a corresponding time step, $p_i$ is the pose of the end effector at the corresponding time step, $p_T$ is the pose of the end effector at the final time step (accordingly, $p_T$–$p_i$ represents an end effector action for the corresponding time step), $TPI_p$ is a is a target placement input that does not correspond to the placement location, and $L_p$ is a negative placement success label.

The training engine 132 utilizes the training examples 149 in training of placement model 150. For example, the training engine 132 can process the training example input, of a training example, using the placement model 150 to generate a predicted placement success, then the loss module 133 can generate a loss based on comparison of the prediction to the placement success label of the training example output of the training example (and optionally based on other comparison(s) from other training examples, in batch techniques). The loss module 133 can then update the placement model 150 based on the loss (e.g., using backpropagation). Through many iterations, the training engine 132 trains the placement model 150.

Figure 3:
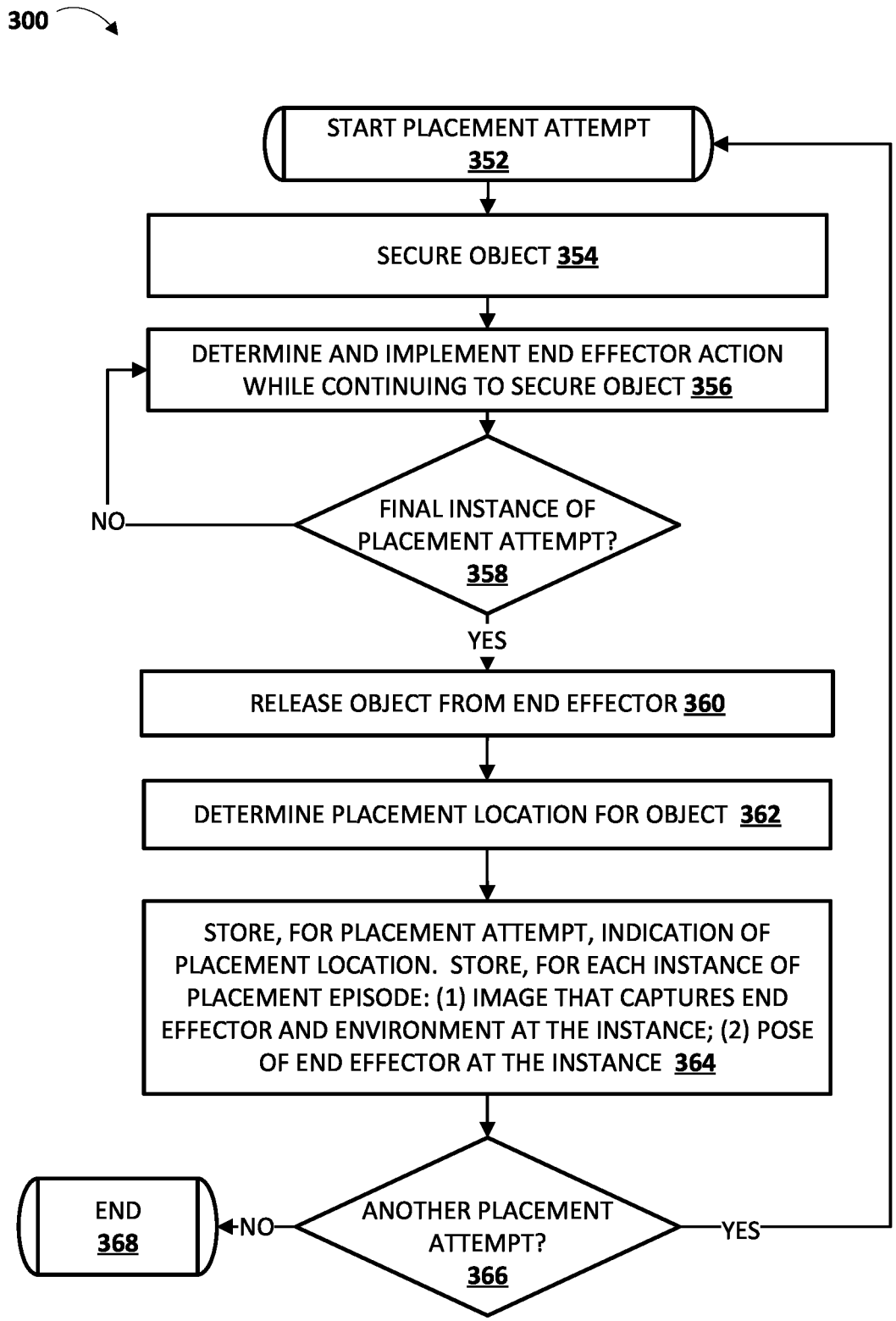
FIG. 3 is a flowchart illustrating an example method of performing placement attempts and storing data associated with the placement attempts.
Figure 4:
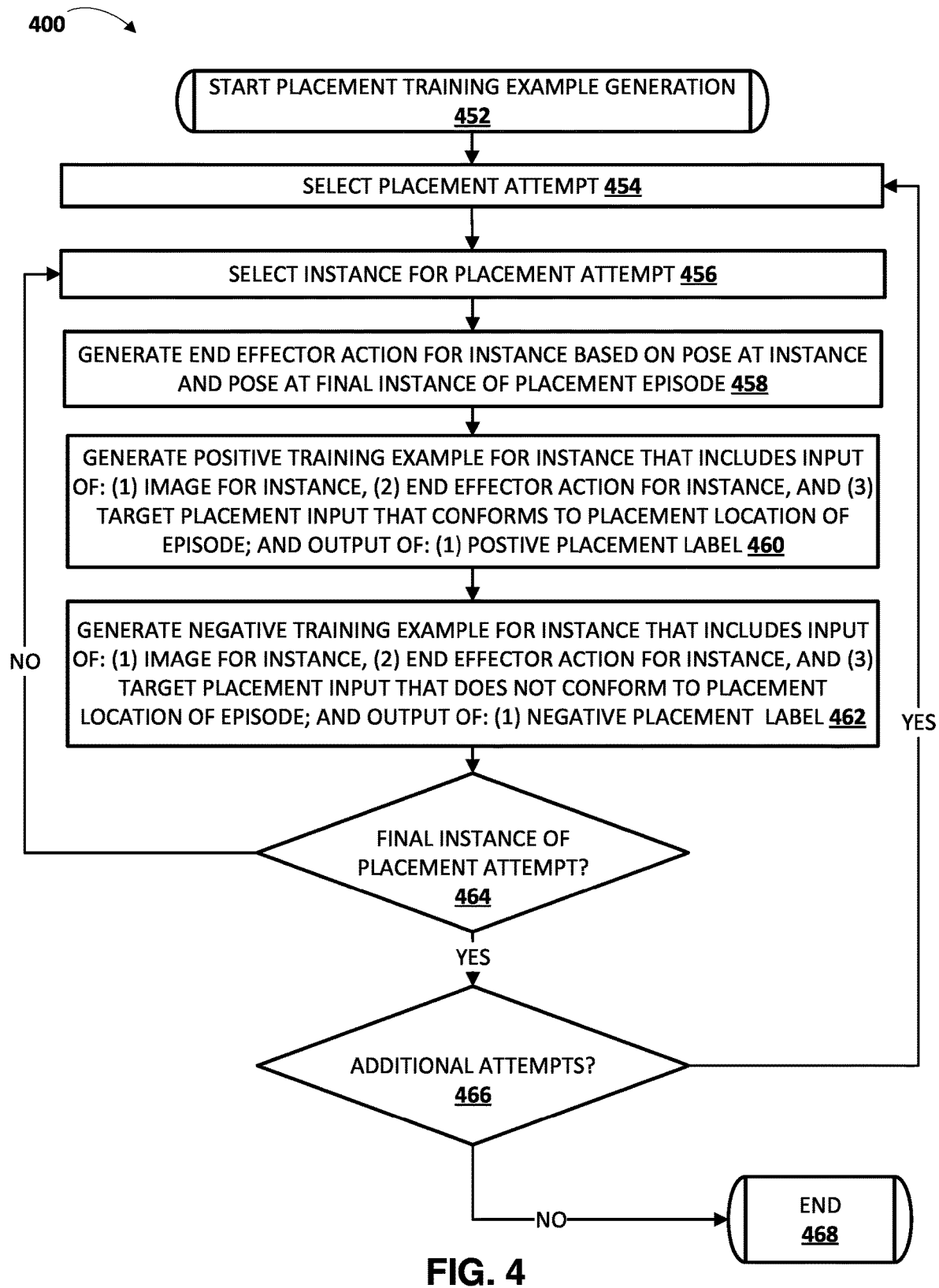
FIG. 4 is a flowchart illustrating an example method of generating placement training examples based on stored data associated with placement attempts.
Figure 5:
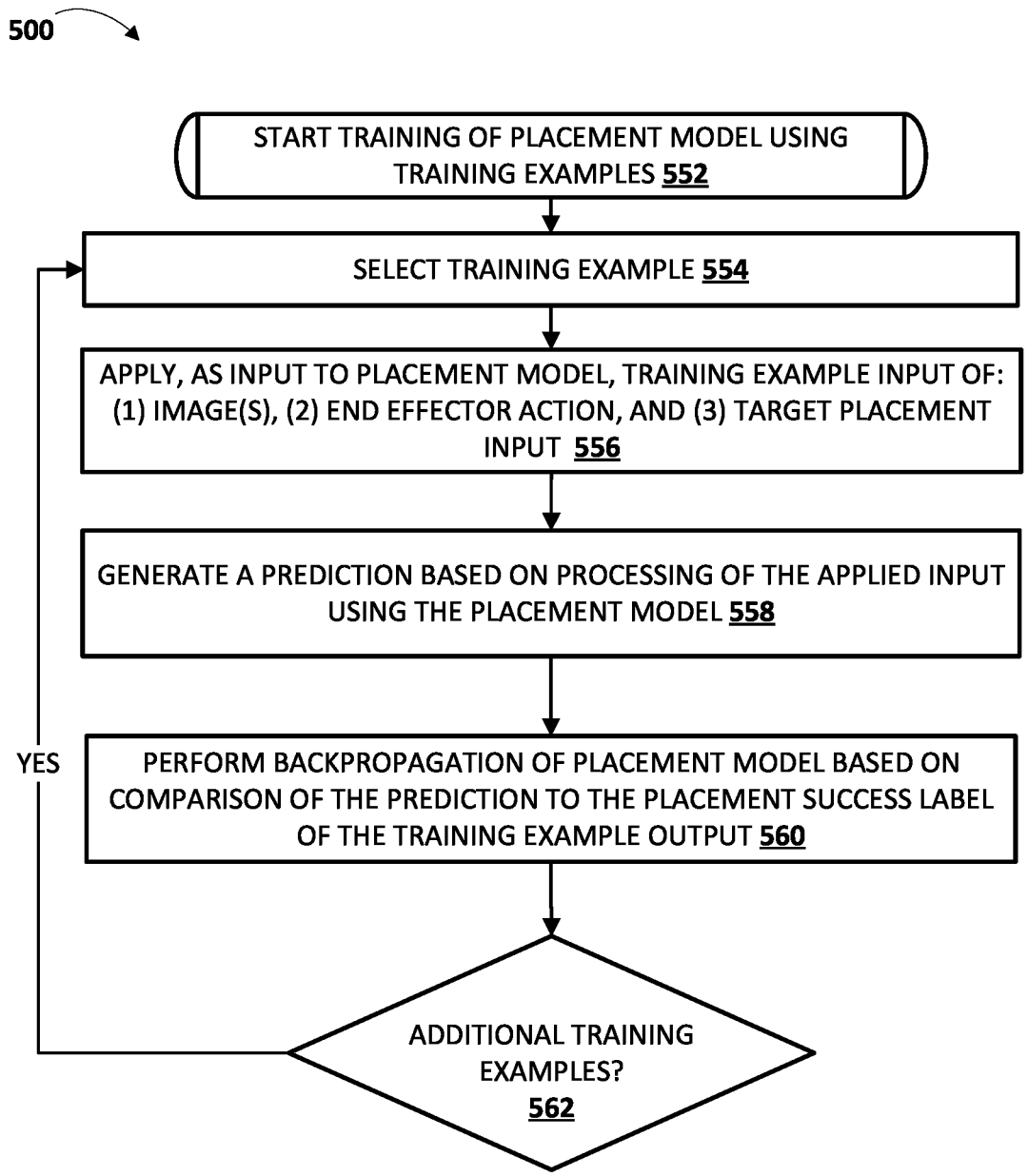
FIG. 5 is a flow chart illustrating an example method of training a placement model using placement training examples.

FIGS. 3, 4, and 5 (described below) provide additional description of performing placement attempts, generating training examples based on the placement attempts, and training a placement model based on the training examples.

Figure 2:
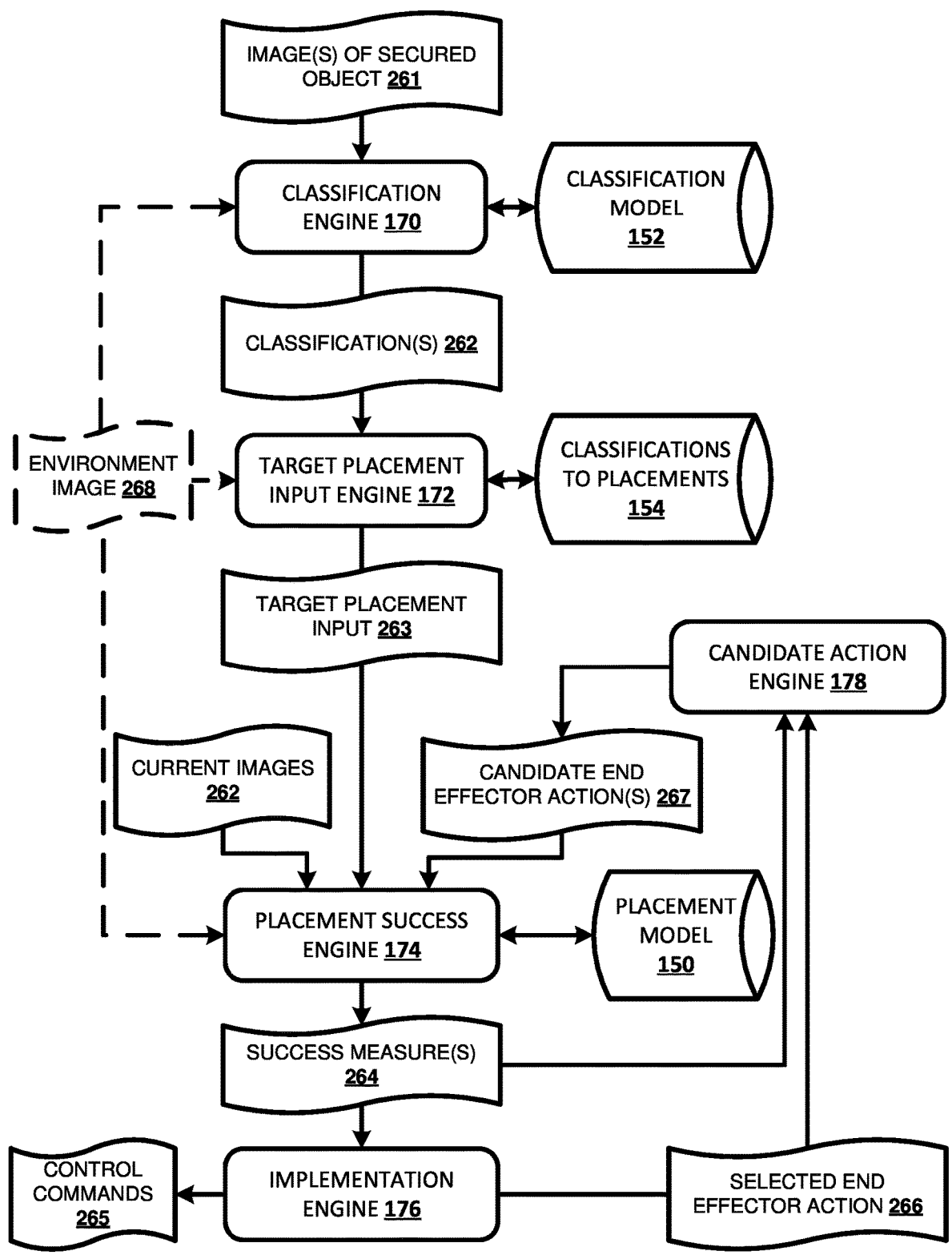
FIG. 2 illustrates an example of determining a target placement input for a grasped object, and utilizing a placement model to place the grasped object in a target location that conforms to the target placement input.

Turning now to FIG. 2, an example is illustrated of determining a target placement input for a secured object, and utilizing placement model 150 (after it is trained) to place the secured object in a target location that conforms to the target placement input. A classification engine 170, a target placement input engine 172, a placement success engine 174, and an implementation engine 176 are illustrated in FIG. 2. In various implementations, the engine(s) 170, 172, 174, and 176 can be implemented by one or more processors of a robot.

In FIG. 2, image(s) of a secured object 261 are provided to classification engine 170. The image(s) of the secured object 261 can be captured by a vision component of a robot after the object has been secured. For example, the image(s) can be captured when an end effector, securing the object, is traversed to position(s) that are near the vision component.

The classification engine 170 processes the image(s) 261 using a classification model 152 to generate, for each of the image(s), one or more candidate classifications. The classification engine 138 select(s), from the one or more candidate classifications, one or more predicted classification(s) 262 to provide to target placement input engine 172. As an example, the image(s) 261 can include five images, and the classification engine 170 can predict a "plastic bottle" candidate classification (or a "plastic" candidate classification and a "bottle" candidate classification) for four of the five images, and a "banana" candidate classification for the remaining image. Based on the quantity of "plastic bottle" candidate classifications exceeding the quantity of "banana" candidate classifications, the classification engine 170 can provide, as classification(s) 262, an indication of the "plastic bottle" classification (or a separate "plastic" classification and "bottle" classification).

The target placement input engine 172 uses the classification(s) 262 to generate, using classifications to placements database 154, an appropriate target placement input 263 for the classification(s) 262. The classifications to placements database 154 can include mappings of various classifications to various target placement inputs (or to data used to generate target placement inputs). For example, "plastic" can be mapped to a semantic identifier that corresponds to a "recycle bin", "banana peel" can be mapped to a semantic identifier that corresponds to a "compost bin", etc. In various implementations, target placement input engine 172 can rely on additional and/or alternative signals in generating a target placement input for a given secured object. For example, the target placement input engine 172, in generating an appropriate target placement input 263, can additionally or alternatively rely on provided data regarding a task being performed by the robot. As one particular example, in addition to classification(s) 262, a "current task" can also be provided to target placement input engine 172, and engine 172 can generate an appropriate target placement input based on both the classification(s) 262 and the "current task". For instance, a "fork" classification with a "loading the dishwasher" task can be mapped (e.g., in classifications to placements database 154) to a semantic identifier that corresponds to a "utensils basket" location, whereas a "fork" classification with a "setting the table" task can be mapped to a target placement input that corresponds to "the left of the dinner plate" location. As yet another particular example, classification(s) 262 can be omitted and a target placement input generated based on a task being performed, and without consideration of the classification(s) 262. For instance, a "pick up toys" task can be mapped to a semantic identifier that corresponds to "the toy bin".

Examples in the preceding paragraph describe a target placement input 263 that is a semantic identifier. However, additional or alternative target placement inputs can be utilized. For example, the classification to placements database 154 can map classifications to images of respective placement locations, and an image of a placement location utilized as the target placement input 263. Also, for example, the classification to placements database 154 can map classifications to classification(s) of respective placement locations, and the target placement input engine 172 (optionally utilizing classification engine 170) can process an environment image 268 and detect a region, in the environment image 268, that includes the classification(s). The target placement input engine 172 can then generate a segmentation mask, bounding box, and/or other spatial identifier, of the environment image, and utilize the spatial identifier as the target placement input.

The target placement input engine 172 provides the target placement input 263 to the placement success engine 174. At each of a plurality of iterations, the placement success engine 174 also receives a respective one of current images 262 (i.e., the single most recently captured current image for that iteration), optionally the environment image 268, and one or more respective candidate end effector actions 267 for consideration. At each iteration, the placement success engine 174 processes the received data using the placement model 150, and generates one or more placement success measures 264, where each of the generated placement success measures 264 is for a corresponding one of the candidate end effector actions 267 considered in that iteration. For example, at an initial iteration the placement success engine 174 can receive, from candidate action engine 178, six (or other value, such as sixty-four) candidate end effector actions 267 to consider. The placement success engine 174 can process, using the placement model 150, a respective one of current images 262 (i.e., the single most recently captured current image for that iteration), the target placement input 263, and a first of the six candidate end effector actions 267 for that iteration, to generate a first success measure, of the success measures 264, that corresponds to the first of the six candidate end effector actions 267. The placement success engine 174 can also process, using the placement model 150, a respective one of current images 262, the target placement input 263, and a second of the six candidate end effector actions 267 for that iteration, to generate a second success measure, of the success measures 264, that corresponds to the second of the six candidate end effector actions 267. The placement success engine 174 can do this for each of the six candidate end effector actions 267 of that iteration.

The success measure(s) 264 are provided to the implementation engine 176, which can select the candidate end effector action with the success measure most indicative of successful placement. For example, where six success measures 264 are provided, each corresponding to a respective one of the six considered candidate end effector action(s) 267, the implementation engine 176 can select one candidate end effector action having the success measure most indicative of success. The implementation engine 176 then generates control commands 265 that correspond to the candidate end effector action. The generated control commands 265, when implemented, will cause the candidate end effector to move as dictated by the candidate end effector action. The implementation engine 176 provides the control commands 265 to one or more actuators (not illustrated in FIG. 2) of the robot to cause the actuator(s) to move the end effector as dictated by the corresponding candidate end effector action.

Continuing with the example, at a next iteration the placement success engine 174 can receive, from candidate action engine 178, six new candidate end effector actions 267 to consider. The placement success engine 174 can process, using the placement model 150, a new respective one of current images 262, the target placement input 263, and a first of the six new candidate end effector actions 267 for the next iteration, to generate a new first success measure, of the success measures 264, that corresponds to the first of the six new candidate end effector actions 267. The placement success engine 174 can do this for each of the six new candidate end effector actions 267 of the next iteration. The success measure(s) 264 for the next iteration are provided to the implementation engine 176, which can select a new candidate end effector action with the success measure most indicative of successful placement. The implementation engine 176 can generate new control commands 265 that correspond to the selected new candidate end effector action, and provide the new control commands 265 to actuator(s). This can continue at a relatively high frequency to thereby cause servoing of the end effector toward a placement location.

At a final iteration, the implementation engine 176 can provide control commands 265 that cause the end effector to release the secured object, thereby leading to the object being placed in the target placement location that corresponds to the target placement input 263. The implementation engine 176 can determine that an iteration is a final iteration based on at least one release criteria being satisfied. The at least one release criteria can include, for example, determining in an iteration that a success measure generated (by placement success engine 174) based on processing, using the placement model 150, a respective one of the current images 262, the target placement input 263, and a "null" candidate end effector action (e.g., that results in no further movement) satisfies one or more thresholds, such as an absolute threshold and/or one or more thresholds that are based on predictions(s) generated in the iteration based on other candidate end effector action(s). In other words, the success measure would be indicative of success of placement if the object was released with no further movement of the end effector. The at least one release criteria can additionally or alternatively include, for example, determining that the success measure for a most recently implemented candidate end effector action satisfied one or more thresholds (e.g., 0.9, 0.95 or other measure when the success measure is from 0 to 1, with higher success measures being more indicative of successful placement). The at least one criteria can additionally or alternatively include, for example, that a threshold quantity of iterations has been performed. In these and other manners, the trained placement model 150 can be utilized to servo an end effector that is securing an object to cause the end effector to traverse to a pose that is likely to result in the object being placed in a target location, and to cause the end effector to release the object at the pose.

Candidate action engine 178 is also illustrated in FIG. 2. At each iteration, candidate action engine 178 generates one or more candidate end effector action(s) 267 for placement success engine 174 to process in cycles of that iteration. In some implementations, candidate action engine 178 utilizes one or more techniques to sample a group of candidate end effector actions and to select a subgroup, from the sampled group, for provision to placement success engine 174. For example, the candidate action engine 178 can utilize an optimization technique, such as the cross-entropy method (CEM). CEM is a derivative-free optimization algorithm that samples a batch of N values at each iteration, fits a Gaussian distribution to N<M of these samples, and then samples a new batch of N from this Gaussian. For instance, the candidate action engine 178 can utilize CEM and values of M=64 and N=6, and perform three iterations of CEM to enable determining of a best available (according to the CEM) candidate end effector action. As illustrated in FIG. 2 by the provision of success measures 264 to the candidate action engine 178, at each iteration of CEM, the candidate action engine 178 can optionally sample a new batch from a Gaussian of the candidate end effector action(s) that resulted in success measure(s), in a prior iteration of CEM, that are most indicative of successful placement. In some implementations, one or more constraints may be imposed on the candidate end effector action that can be generated by the candidate action engine 178. For example, the candidate end effector motions evaluated by CEM or other technique may be constrained based on the constraints. One example of constraints are computer generated and/or human inputted constraints (e.g., via a user interface input device of a computer system) that imposes constraints on area(s) in which placements may be attempted. Yet other examples of constraints include, for example, constraints based on a workspace of the robot, joint limits of the robot, torque limits of the robot, constraints provided by a collision avoidance system and that restrict the movement of the robot to prevent collision with one or more objects, etc. Optionally, the selected end effector action 266, selected by the implementation engine 176 in a prior iteration, can be provided to the candidate action engine 178 for use in selecting candidate end effector action(s) 267 for a next iteration.

Figure 6:
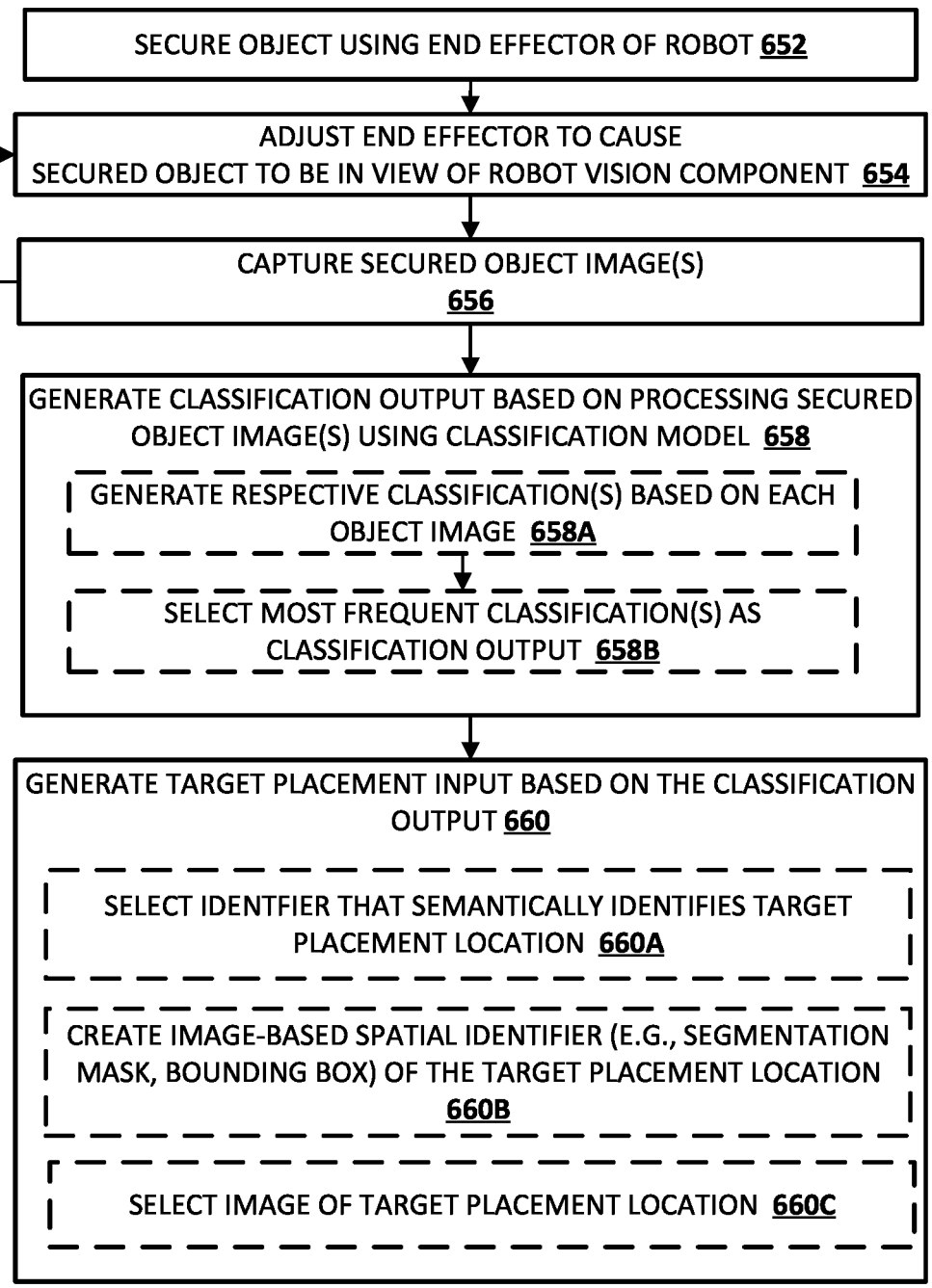
FIG. 6 is a flowchart illustrating an example method of generating a target placement input for a grasped object, where the target placement input indicates a target location for placing the grasped object.
Figure 7:
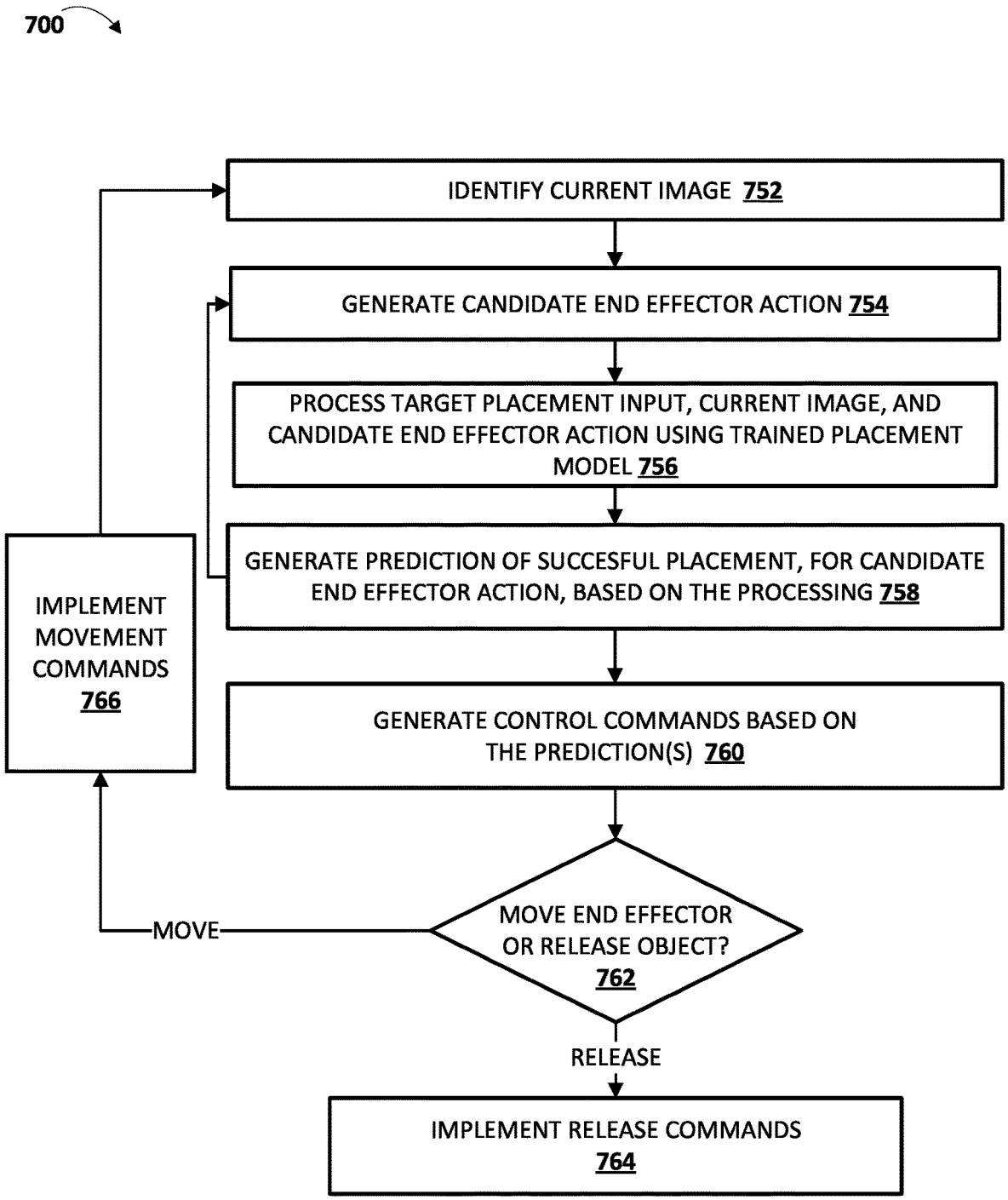
FIG. 7 is a flowchart illustrating an example method of utilizing a placement model to servo an end effector to place a secured object at a target location.

FIGS. 6 and 7 (described below) provide additional description of determining a target placement input for a secured object, and utilizing placement model (after it is trained) to place the secured object in a target location that conforms to the target placement input.

Turning now to FIGS. 3-7, various example methods are described with reference to operations of flow charts of those figures. For convenience, the operations of the flow charts described below are described with reference to a system that performs the operations. The system can include one or more components of a robot and/or one or more components of a separate computing system. Moreover, different systems can perform the operations of different flowcharts. Additionally, while the operations of the flow-charts are shown in a particular order, this is not meant to be limiting. One or more operations may be reordered, omitted or added.

FIG. 3 is a flowchart illustrating an example method 300 of performing placement attempts and storing data associated with the placement attempts.

At block 352, the system starts a placement attempt.

At block 354, the system secures an object. For example, in simulated placement attempts, the end effector of a simulated robot can be caused to secure the corresponding object through placement of the corresponding object and/or manipulation of the end effector in simulation. Also, for example, in real-world placement attempts, the corresponding object can be secured by the end effector by a human manually placing the object, or through the robot automatically grasping the object using one or more object securing techniques.

At block 356, the system determines and implements an end effector action while continuing to secure the object. For example, the system can generate one or more motion commands to cause one or more actuators that control a pose of the end effector to actuate, thereby changing the pose of the end effector. In some implementations and/or iterations of block 356, the motion command(s) may be random within a given space, such as the work-space reachable by the end effector, a restricted space within which the end effector is confined for the placement episodes, and/or a space defined by position and/or torque limits of actuator(s) that control the pose of the end effector. Random as used herein may include truly random or pseudo-random. In some implementations, prior to the first iteration of block 356 the end effector may be randomly or otherwise moved "into position". For example, the end effector may be moved back to a set "starting position" and/or moved to a randomly selected position within a given space.

At block 358, the system determines whether the current instance is a final instance of the placement attempt. For example, the system can determine whether a threshold quantity of instances have been performed, whether a threshold amount of time has passed, whether a threshold number of computing cycles have been performed, and/or other criterion/criteria has been met.

If, at an iteration of block 358, it is determined that the current instance is not a final instance of the placement attempt, the system returns to block 356 to determine and implement an additional end effector action while continuing to secure the object.

If, at an iteration of block 358, it is determined that the current instance is a final instance of the placement attempt, the system proceeds to block 360 to release the object from the end effector.

At block 362, the system determines a placement location for the object (i.e., determines a location where the object was placed). In real-world placement attempts, block 362 can include capturing one or more images after the placement attempt and using the image(s) to determine the placement location. For example, the image(s) can be provided to a computing device of a human reviewer and the human reviewer can indicate, through user interface input at the computing device, a placement location for the placement attempt. In simulated placement attempts, block 362 can include determining the placement location based on simulated data from the simulator (e.g., the simulated data will enable direct determination of where the object was placed).

At block 364, the system stores, for the final instance of the placement attempt, an indication of the placement location. Further, at block 364 the system stores, for each instance of the placement attempt: (1) an image that captures the end effector and an environment at each instance of the placement attempt, and (2) a pose of the end effector at each instance of the placement attempt. For example, the system may store a current image generated by a vision component associated with the robot and associate the image with the current instance (e.g., with a timestamp). Also, for example the system may determine the current pose of the end effector based on data from one or more joint position sensors of joints of the robot whose positions affect the pose of the robot, and the system may store that pose. The system may determine and store the pose of the end effector in task-space, joint-space, or another space. Optionally, an environment image is also stored for the placement attempt.

At block 366, the system determines whether there is another placement attempt.

If, at an iteration of block 366, it is determined that there is another placement attempt, the system returns to block 352 to start another placement attempt.

If, at an iteration of block 366, it is determined that there is not another placement attempt, the system proceeds to block 368 and the method 300 ends. Another iteration of method 300 may be performed again at a later time. Optionally, at another iteration of method 300, it can be performed using an "initially trained" placement model (trained based on training examples generated from training data of a prior iteration of method 300) to bootstrap the training data generation process, and the training data gathered utilized to generate additional training examples that can be used to further train the placement model. For example, in such another iteration, block 356 can include determining the end effector action based on the "initially trained" placement model (e.g., in lieu of randomly determining the end effector action).

In some implementations, the method 300 of FIG. 3 may be implemented on each of a plurality of real and/or simulated robots, optionally operating in parallel during one or more (e.g., all) of their respective iterations of method 300. In some implementations, the environment, secured object, and placement location(s) may be different during different iterations of the method 300.

FIG. 4 is a flowchart illustrating an example method 400 of generating placement training examples based on stored data associated with placement attempts.

At block 452, the system starts placement training example generation.

At block 454, the system selects a placement attempt. For example, the system may access a database that includes data associated with a plurality of stored placement attempts, and select one of the stored placement attempts. The selected placement attempt may be, for example, a placement attempt generated based on the method 300 of FIG. 3.

At block 456, the system selects an instance for the placement attempt. For example, the system may select data associated with the instance based on a timestamp and/or other demarcation associated with the data that differentiates it from other instances of the placement attempt.

At block 458, the system generates an end effector action for the instance based on a pose at the instance and based on a pose at a final instance of the placement attempt.

At block 460, the system can optionally generate a positive training example for the instance that includes input of: (1) a captured image for the instance, (2) the end effector action generated for the instance at block 458, and (3) a target placement input that conforms to a placement location of the placement attempt; and output of: (1) a positive placement label. The system can generate a positive training example at block 460 when there is a target placement input that conforms to the placement location of the placement attempt. For example, where the placement location of the placement attempt is a recycle bin, a positive training example can be generated for a target placement input that corresponds to the recycle bin. For placement attempts where the placement location does not conform to any available target placement input (e.g., the placement location was in an undesired location), only negative training example(s) can be generated for those placement attempts. In other words, for such placement attempts block 460 will not be performed. As described herein, various types of target placement inputs can be used such as a semantic identifier of a target placement location, image(s) of the target placement location, and/or a segmentation mask and/or bounding box that conforms to the target placement location.

At block 462, the system optionally generates a negative training example for the instance that includes input of: (1) a captured image for the instance, (2) the end effector action generated for the instance at block 458, and (3) a target placement input that does not conform to a placement location of the placement attempt; and output of: (1) a negative placement label. Accordingly, the negative training example will include a target placement input that does not conform to the placement location of the placement attempt. Optionally, multiple negative training examples can be generated for an instance at block 462, each utilizing a different target placement input that does not conform to the placement location of the placement attempt.

In some implementations, the training example input for the positive and negative training examples further includes an additional image, such an additional environment image taken before the placement episode to which the instance belongs.

At block 464, the system determines whether the selected instance is the final instance of the placement attempt.

If, at an iteration of block 464, the system determines the selected instance is not the final instance of the placement attempt, the system returns to block 456 and selects another instance for the placement attempt.

If, at an iteration of block 464, the system determines the selected instance is the final instance of the placement attempt, the system proceeds to block 466.

At block 466, the system determines whether there are additional placement attempts.

If, at an iteration of block 466, the system determines there are additional placement attempts to process, the system returns to block 454 and selects another placement attempt. In some implementations, determining whether there is an additional placement attempt to process may include determining whether there are any remaining unprocessed placement attempts. In some implementations, determining whether there are additional placement attempts to process may additionally and/or alternatively include determining whether a threshold number of placement training examples has already been generated and/or other criteria has been satisfied.

If, at an iteration of block 466, the system determines there are no additional placement attempts to process, the system proceeds to block 468 and the method 400 ends. Another iteration of method 400 may be performed again. For example, and as described above, a placement model, trained initially based on training examples generated based on an initial iteration of method 400, can be used in generating additional training data—and such training data utilized in performing another iteration of method 400 to generate further training examples for further training of the placement model.

FIG. 5 is a flow chart illustrating an example method 500 of training a placement model using placement training examples.

At block 552, the system starts training of a placement model using training examples.

At block 554, the system selects a training example. For example, the system may select a placement training example generated based on the method 400 of FIG. 4.

At block 556, the system applies, as input to the placement model, training example input of: (1) a current image (and optionally an environment image) of the training example, (2) an end effector action of the training example, and (3) a target placement input of the training example. In some implementations the current image and optionally the environment image for the training example are applied as input to an initial layer of the placement model, and the end effector action is applied as side input to a downstream layer of the placement model. For example, the two images can be concatenated, applied to the initial layer, and processed over the initial layer and optionally one or more additional layers to generate intermediate output. The motion vector can then be concatenated with the intermediate output and the concatenation applied to one or more additional layers of the placement model. The target placement input can be applied as further side input to a downstream layer, or along with the image(s) to the initial layer.

At block 558, the system generates a prediction (i.e., a probability or other success measure) based on processing of the applied input at block 556 using the placement model.

At block 560, the system updates the parameters of the placement model based on comparison of the prediction to the placement success label of the training example output. For example, the system can update the parameters with a method that is based on the comparison, such as, for instance, error backpropagation of the placement model.

At block 562, the system determines whether there are additional simulated instance training examples. If so, the system can proceed back to block 554, select an additional simulated instance training example, and further train the placement model based on the additional simulated instance training example. Although method 500 is described with respect to performing backpropagation based on the prediction and the placement success label of the training example, in various implementations batch techniques can be utilized in which backpropagation is performed based on a loss determined based on a batch of predictions and the placement success labels, of a batch of training examples.

FIG. 6 is a flowchart illustrating an example method 600 of generating a target placement input for a secured object, where the target placement input indicates a target location for placing the secured object.

At block 652, the system secures an object using an end effector of a robot. For example, the system can secure the object by manipulating the end effector, using one or more grasping techniques, to cause the end effector to grasp the object.

At block 654, the systems adjusts the end effector to cause the secured object to be in view of the vision component of the robot.

At block 656, the system captures one or more secured object images, using the vision component, where each of the secured object images captures the secured object when the secured object is in view of the vision component based on the adjustment of block 654. The system can optionally perform multiple iterations of blocks 654 and 656 to cause image(s) to be captured when the end effector is in a first pose, image(s) to be captured when the end effector is in a second pose, etc. In other words, images can continue to be captured as the end effector is adjusted to multiple poses, each with the secured object in view of the robot vision component.

At block 658, the system generates a classification output based on processing of one or more of the secured object images (captured at block 656) using a classification model. Block 658 may optionally include sub-blocks 658A and 658B.

At sub-block 658A, the system generates one or more respective classifications based on each of the one or more secured object images. At sub-block 658B, the system selects one or more most frequent classifications from the one or more respective classifications as a classification output. As one example of sub-blocks 658A and 658B, assume five images captured at block 656. At block 658A the classification engine can predict a "fork" classification for three of the five images, and a "knife" classification for the remaining two images. At block 658B the system can select the "fork" classification based on it being the most frequent classification (three as compared to two).

At block 660, the system generates a target placement input based on the classification output. In some implementations, at block 660 the system additionally or alternatively generates the target placement input based on a task being performed by the robot, and/or based on one or more other criteria. At block 660, the system may optionally include one or more of sub-blocks 660A, 660B, and 660C.

At sub-block 660A, the system can select an identifier that semantically identifies a target placement location, and use the identifier as all or part of the target placement input. For example, a semantic identifier can be selected based on it being mapped to the classification (and optionally a robot task) in one or more databases. For instance, a semantic identifier of "compost bin" (or "0", "AZ84" or other identifier of a compost bin) can be utilized as the target placement input based on it being mapped to classification output(s) of block 658, such as classification output(s) of "food" and/or "compostable". Also, for instance, a semantic identifier of "recycle bin" (or "1", "QX23" or other identifier of a recycle bin) can instead be utilized as the target placement input based on it being mapped to classification output(s) of block 658, such as classification output(s) of "plastic bottle" and/or "recyclable".

At sub-block 660B, the system creates an image-based spatial identifier (e.g., a segmentation mask, a bounding box) of the target placement location, and uses the image-based spatial identifier as all or part of the target placement input. For example, the image-based spatial identifier can be relative to an environment image that captures the environment, including the target placement location. The image-based spatial identifier can identify a spatial location of the target placement location in the environment image. The spatial location of the target placement location in the environment image can be determined based on processing of the environment image to detect an area, of the environment image, where classification(s) for the target placement location is present. For example, if the target placement location is a recycle bin, an area of the environment image can be selected, as the spatial location of the target placement location, based on processing indicating that the area includes an object with a classification of "recycle bin". For instance, the processing can generate bounding boxes for detected objects and classifications for the bounding boxes, and one of the bounding boxes selected as the spatial location based on it having a "recycle bin" classification. The target placement location can be selected based on the target placement location being mapped to the classification of the secured object and/or to the robot task. For example, "recycle bin" can be selected as a target placement location based on "recycle bin" being mapped to classification(s) of a secured aluminum can, such as "recyclable", "aluminum", and/or "can" classifications). Also, for example, "toy bin" can be selected as a target placement location based on "toy bin" being mapped to classification(s) of a "clean up toys" robot task being performed. In some implementations, a human reviewer can indicate a spatial location of the target placement location by reviewing an environmental image and providing user interface input to indicate the spatial location. For example, the user can be provided with the environmental image and an image of the secured object (or the classification output indicating classification(s)), and can be mark an area in the environmental image that is a target placement location for the secured object.

At sub-block 660C, the system selects an image of the target placement location, and uses the image as all or part of the target placement input. For example, the image can be selected based on it being mapped to the classification (and optionally the robot task) in one or more databases. For instance, for a secured object having a classification output (of block 658) of "recyclable", an image of a "recycle bin" can be selected based on the image of the "recycle bin" being mapped to a "recyclable" classification. Also, for instance, for a secured object having a classification of "compostable", an image of a "compost bin" can be selected based on the image of the "compost bin" being mapped to a "compostable" classification. In other words, the databases can be utilized to retrieve a "stock" image of a target placement location, based on that image being mapped to classification(s) of a secured object, and that "stock" image can be used as all or part of the target placement input.

With reference to FIG. 7, a flowchart illustrating an example method 700 of utilizing a trained placement model to servo an end effector to place a secured object at a target location is illustrated. As described below, the method 700 can utilize the target placement input generated in block 660 of method 600 (FIG. 6).

At block 752, the system identifies a current image, such as a current image that captures the end effector and at least part of an object secured by the end effector. In some implementations, the system also identifies an additional image, such as an environment image captured at the start of the servoing to place a secured object. In some implementations, the additional image is captured by a vision component when the end effector was at least partially out of view of the vision component.

At block 754, the system generates a candidate end effector action. The candidate end effector action can be defined in task-space, joint-space, or other space, depending on the input parameters of the trained placement model to be utilized in further blocks. In some implementations, the system generates a candidate end effector action that is random within a given space, such as the work-space reachable by the end effector, a restricted space within which the end effector is confined for the placement attempts, and/or a space defined by position and/or torque limits of actuator(s) that control the pose of the end effector. In some implementations, the system may utilize one or more techniques to sample a group of candidate end effector actions and selects the end effector action from the sampled group. For example, the system may utilize an optimization technique, such as the cross-entropy method (CEM).

At block 756, the system processes a target placement input (e.g., generated at block 660 of method 600), the current image identified at block 752, and the candidate end effector action generated at block 754 using the trained placement model. The placement model can be one trained based on the method 500 of FIG. 5. In some implementations the current image and optionally the environment image for the training example are applied as input to an initial layer of the placement model, and the end effector action is applied as side input to a downstream layer of the placement model. For example, the two images can be concatenated, applied to the initial layer, and processed over the initial layer and optionally one or more additional layers to generate intermediate output. The motion vector can then be concatenated with the intermediate output and the concatenation applied to one or more additional layers of the. The target placement input can be applied as further side input to a downstream layer, or along with the image(s) to the initial layer.

At block 758, the system generates a prediction of successful placement, for the candidate end effector action, based on the processing at block 756. The prediction predicts the likelihood of successful placement of the secured object, in a target location corresponding to the target placement input, if the candidate end effector action is implemented. The system may iteratively cycle through blocks 754, 756, and 758 each time generating a different candidate end effector action at block 754, but using the same current image and target placement input at block 756, and generating an additional prediction of successful placement, at block 756, that is specific to the considered candidate end effector action. As described herein, each candidate end effector action considered in a cycle can be generated using CEM and/or other technique(s).

At block 760, the system generates control commands based on the generated prediction(s) of block 758. For example, the system can generate control commands based on the end effector action that corresponds to the prediction that is most indicative of a successful placement. The control commands, when provided to actuator(s) of the robot, cause the end effector to move, directionally and/or rotationally, as dictated by the end effector action that corresponds to the prediction that is most indicative of successful placement. Generally, at block 760, the system generates control commands that seek to achieve (through one or more iterations of method 700) a release of the secured object in a target location that corresponds to the target placement input. For example, at each of a plurality of iterations of block 760, the system generates control commands that causes the end effector to move and/or rotate and, at a final iteration, the system generates control commands that cause the end effector to release the secured object. The control commands can be generated, at the final iteration, to release the secured object based on, for example, the prediction(s) of a most recent iteration of block 758 satisfying a certain threshold, based on a current prediction based on a "null" end effector command satisfying a certain threshold, and/or other criterion/criteria.

At block 762, the system determines whether the control commands are movement commands or release commands. Movement commands are control commands that cause the end effector to be moved translationally and/or rotationally, while continuing to secure the object. Release commands are control commands that cause the end effector to release the secured object. If the system determines at block 762 that the control commands are release commands (e.g., one or more release criteria are satisfied), the system proceeds to block 764 and implements the release commands, thereby causing the secured object to be released. If the system determines at block 762 that the control commands are movement commands, the system proceeds to block 766 and implements the movement commands, then returns to blocks 752, where it identifies a new current image.

In many implementations, blocks of method 700 may be performed at a relatively high frequency, thereby enabling iterative updating of end effector commands and enabling servoing of the end effector along a trajectory that is informed by the trained instance placement model to lead to a relatively high probability of placement of a secured object in a target location that corresponds to a target placement input.

Figure 8:
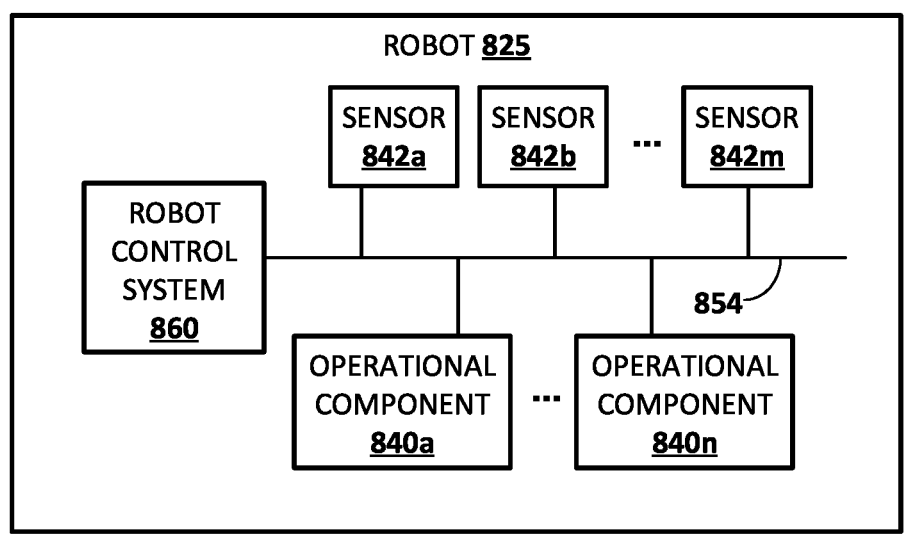
FIG. 8 schematically depicts an example architecture of a robot.

FIG. 8 schematically depicts an example architecture of a robot 825. The robot 825 includes a robot control system 860, one or more operational components 840a-840n, and one or more sensors 842a-842m. The sensors 842a-842m may include, for example, vision components, light sensors, pressure sensors, pressure wave sensors (e.g., microphones), proximity sensors, accelerometers, gyroscopes, thermometers, barometers, and so forth. While sensors 842a-842m are depicted as being integral with robot 825, this is not meant to be limiting. In some implementations, sensors 842a-842m may be located external to robot 825, e.g., as standalone units.

Operational components 840a-840n may include, for example, one or more end effectors and/or one or more servo motors or other actuators to effectuate movement of one or more components of the robot. For example, the robot 825 may have multiple degrees of freedom and each of the actuators may control actuation of the robot 825 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 860 may be implemented in one or more processors, such as a CPU, GPU, and/or other controller(s) of the robot 825. In some implementations, the robot 825 may comprise a "brain box" that may include all or aspects of the control system 860. For example, the brain box may provide real time bursts of data to the operational components 840a-840n, with each of the real time bursts comprising a set of one or more control commands that dictate, inter alia, the parameters of motion (if any) for each of one or more of the operational components 840a-840n. In some implementations, the robot control system 860 may perform one or more aspects of one or more methods described herein.

As described herein, in some implementations all or aspects of the control commands generated by control system 860 in positioning an end effector to release a secured object in a target placement location may be based on control commands generated based on utilization of placement model. For example, a vision component of the sensors 842a-842m may capture a current image and an additional image, and the robot control system 860 may generate a target placement input based on a classification of a secured object and/or a robot task being performed. The robot control system 860 may process the current image, the additional image, a candidate motion vector, and the target placement input utilizing a trained placement model and utilize a prediction generated based on the processing to generate one or more control commands for controlling an end effector of the robot. Although control system 860 is illustrated in FIG. 8 as an integral part of the robot 825, in some implementations, all or aspects of the control system 860 may be implemented in a component that is separate from, but in communication with, robot 825. For example, all or aspects of control system 860 may be implemented on one or more computing devices that are in wired and/or wireless communication with the robot 825, such as computing device 910.

Figure 9:
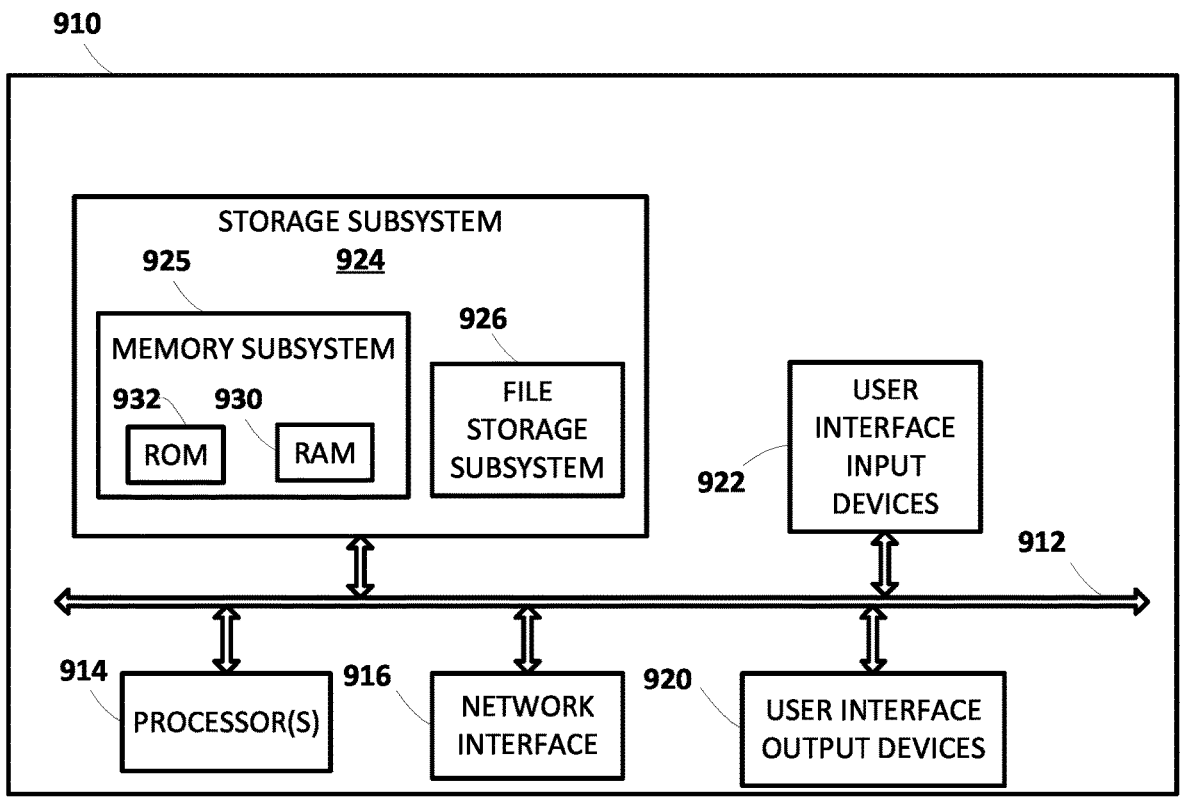
FIG. 9 schematically depicts an example architecture of a computer system.

FIG. 9 is a block diagram of an example computing device 910 that may optionally be utilized to perform one or more aspects of techniques described herein. For example, in some implementations computing device 910 may be utilized to operate robot simulator(s) in generating training data, may be utilized in generating training examples based on training data, and/or may be utilized in training a placement model. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of one or more methods described herein.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

What is claimed is:

1. A robot, comprising:
a vision component;
actuators;
an end effector;
memory storing: instructions, a trained classification model, and a trained placement model;
one or more processors, executing the instructions, to perform a method comprising:
identifying one or more object images, from the vision component, that each capture an object in an environment of the robot;
generating a target placement input that indicates at least one characteristic of a placement location for the object, wherein generating the target placement input is based on classification output generated by processing the one or more object images using the trained classification model;
while the end effector of the robot is securing the object:
identifying a current image, from the vision component, that captures the end effector and at least part of the environment;
generating candidate end effector actions that each define corresponding motion to move the end effector;
for each candidate end effector action of the candidate end effector actions:
processing, using the trained placement model, the target placement input, the current image, and the candidate end effector action, and
generating, based on the processing, a prediction of successful placement of the object with application of the motion defined by the corresponding candidate end effector action;
generating control commands that conform to the candidate end effector action that, when processed using the trained placement model, resulted in the prediction that is most indicative of successful placement of the object; and
providing the control commands to one or more of the actuators of the robot to cause the end effector to move while continuing to secure the object;
determining to cause the end effector to release the object after providing the control commands; and
in response to determining to cause the end effector to release the object, providing one or more additional control commands to cause the end effector to release the object.

2. The robot of claim 1, wherein determining to cause the end effector to release the object is based on determining that the prediction, that is most indicative of successful placement of the object, satisfies one or more criteria.

3. The robot of claim 1, wherein determining to cause the end effector to release the object comprises:
generating an additional prediction based on processing, using the trained placement model: the target placement input, an additional current image, and a null end effector action, wherein the additional current image is captured after providing the end effector motion command; and
determining to cause the end effector to release the object based on the additional prediction satisfying one or more criteria.

4. The robot of claim 1, wherein the one or more object images are captured by the vision component while the object is secured by the end effector of the robot.

5. The robot of claim 1, wherein the method performed by the one or more processors further comprises:
  causing, after the end effector has secured the object, the end effector of the robot to move to one or more predetermined poses relative to the vision component; and
  causing the one or more object images to be captured while the end effector is in the one or more predetermined poses;
  wherein identifying the one or more object images is based on the one or more object images being captured by the vision component while the end effector is in the one or more predetermined poses.

6. The robot of claim 1, wherein the classification output indicates at least one semantic classification of the object, and wherein generating the target placement input is based on the semantic classification being mapped to the target placement input.

7. The robot of claim 6, wherein the target placement input comprises a semantic identifier that identifies one of a plurality of candidate placement locations.

8. The robot of claim 7, wherein the plurality of candidate placement locations comprise two or more of a trash bin, a recycle bin, and a compost bin.

9. The robot of claim 6, wherein the semantic classification of the object indicates one or more of: a class of the object, a weight of the object, a size of the object, and a material of the object.

10. The robot of claim 1, wherein the target placement input comprises an image that is similar to the placement location.

11. The robot of claim 1, wherein the target placement input comprises an image-based spatial identifier of the target placement location.

12. The robot of claim 1, wherein the method performed by the one or more processors further comprises:
  identifying a task being performed by the robot;
  wherein generating the target placement input is further based on the task being performed by the robot.

13. A robot, comprising:
  a vision component;
  actuators;
  an end effector;
  memory storing: instructions and a trained placement model;
  one or more processors, executing the instructions, to perform a method comprising:
    generating a target placement input that indicates at least one characteristic of a placement location for an object secured by the end effector;
    at each of a plurality of iterations while the end effector is securing the object, and until determining that at least one release criteria is satisfied:
      moving the end effector of the robot while the end effector of the robot is securing the object, wherein moving the end effector of the robot is based on predictions of successful placement that are each generated based on processing, using the trained placement model, of:
        the target placement input,
        a corresponding current image that is captured by the vision component and that captures the end effector, and
        a corresponding candidate end effector action that defines corresponding motion to move the end effector;
    in response to determining that the at least one release criteria is satisfied: causing the end effector to release the secured object.

14. The robot of claim 13, wherein determining that the at least one criteria is satisfied is based on at least one of:
  one of the generated predictions, or
  an additional prediction generated based on processing, using the trained placement model, of: the target placement input, an additional current image, and a null end effector action.

15. The robot of claim 13, wherein the method performed by the one or more processors further comprises:
  identifying a task being performed by the robot;
  wherein generating the target placement input is based on the task being performed by the robot.

16. The robot of claim 13, wherein the method performed by the one or more processors further comprises:
  classifying the object based on one or more images of the object that are captured by the vision component of the robot;
  wherein generating the target placement input is based on the classifying.

* * * * *